Figure 1:
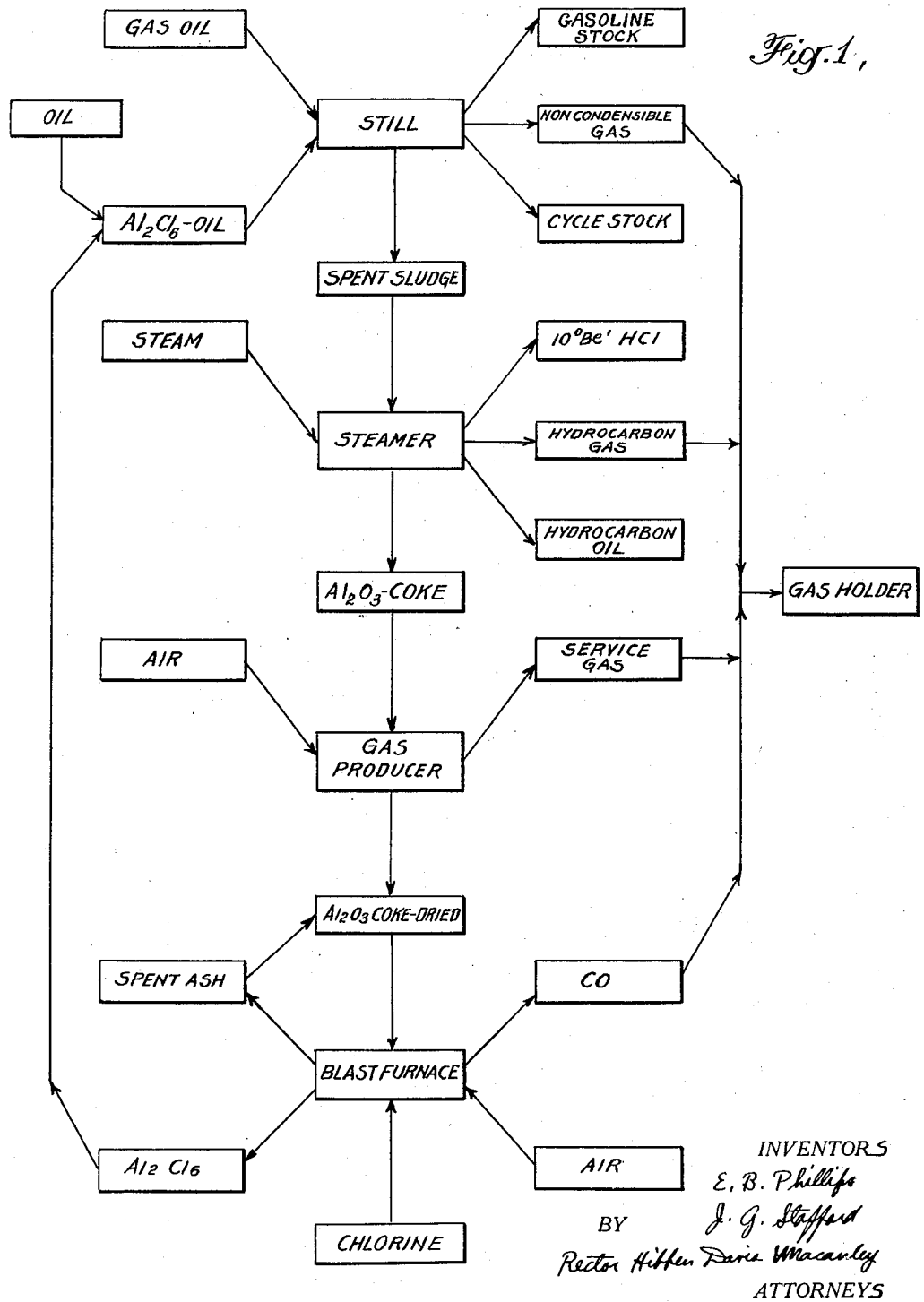

June 3, 1930.  E. B. PHILLIPS ET AL  1,760,962
PROCESS FOR THE REGENERATION OF ALUMINUM CHLORIDE SLUDGE
Filed March 13, 1923   3 Sheets-Sheet 2
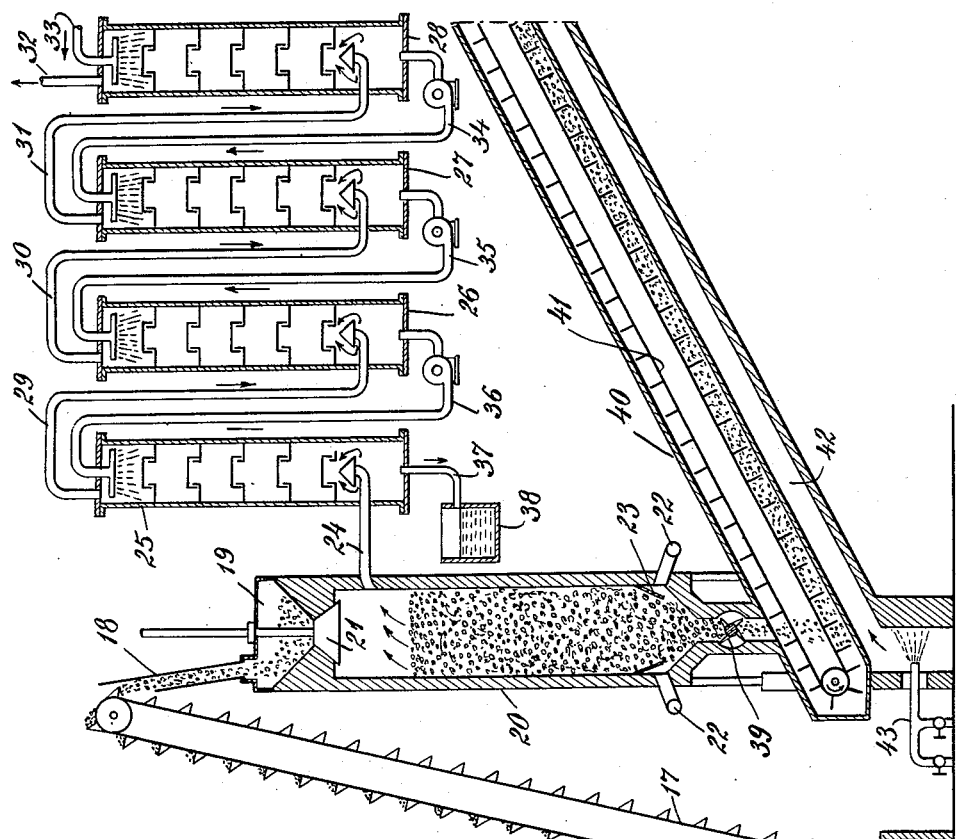
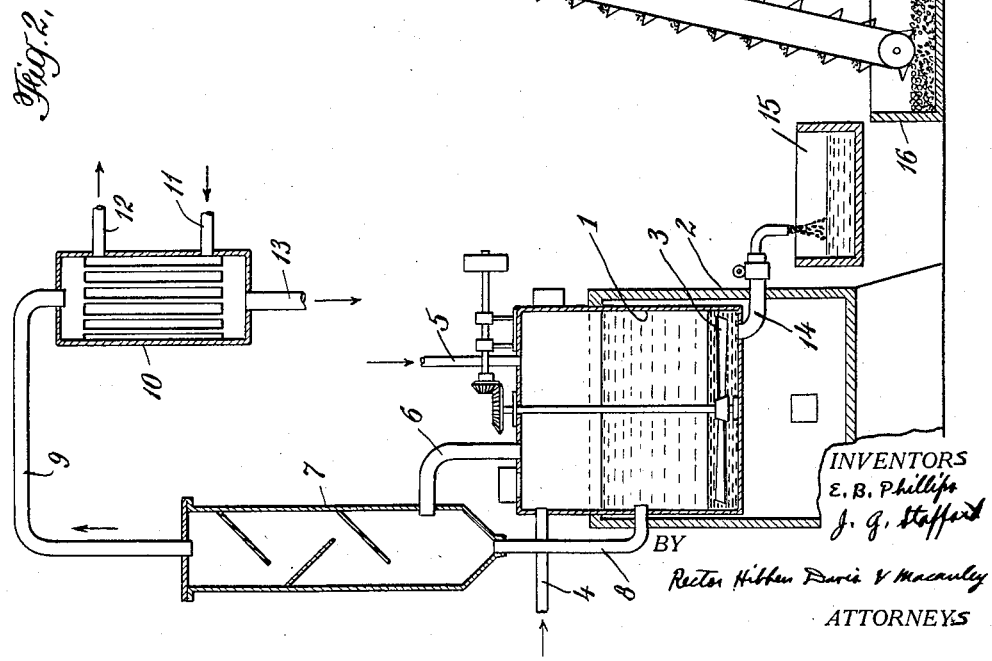
INVENTORS
E. B. Phillips
J. G. Stafford
BY
Rector Hibben Davis & Macauley
ATTORNEYS June 3, 1930.  E. B. PHILLIPS ET AL  1,760,962
PROCESS FOR THE REGENERATION OF ALUMINUM CHLORIDE SLUDGE
Filed March 13, 1923  3 Sheets-Sheet 3

INVENTORS
E. B. Phillips
J. G. Stafford
BY
Rector Hibben Davis & Macauley
ATTORNEYS Patented June 3, 1930

1,760,962

UNITED STATES PATENT OFFICE

ERNEST B. PHILLIPS, OF EAST CHICAGO, INDIANA, AND JAMES G. STAFFORD, OF CHICAGO, ILLINOIS, ASSIGNORS TO SINCLAIR REFINING COMPANY, OF CHICAGO, ILLINOIS, A CORPORATION OF MAINE

PROCESS FOR THE REGENERATION OF ALUMINUM-CHLORIDE SLUDGE

Application filed March 13, 1923. Serial No. 624,775.

This invention relates to the treatment of aluminum chloride sludge which is formed in the cracking of heavier hydrocarbons and intermediate fractions from crude petroleum, such as gas oil, for the production of lighter more valuable hydrocarbons, such as gasoline, by the use of aluminum chloride as a catalytic agent.

The advantages of the use of aluminum chloride as a catalyzer in the cracking process have long been recognized. It has long been known that by the use of this reagent the high temperature and pressure which are necessary in the cracking processes generally in commercial use may be dispensed with and a sweeter product containing a considerably smaller proportion of objectionable unsaturated hydrocarbons obtained. The cost of aluminum chloride, however, has heretofore prevented the catalytic process from competing commercially with the high pressure, high temperature process. The initial cost of aluminum chloride suitable for the purpose is high and, though it appears to act entirely catalytically, its efficiency rapidly decreases with use and it ultimately becomes "poisoned" or inactive. The process is commonly terminated with the residue in the condition of a heavy tar or asphalt with which the more or less spent aluminum chloride is mixed. A number of methods have been proposed for the recovery of the aluminum chloride both in the wet and in the dry way but they have been found so expensive as not to reduce the cost of cracking catalytically to a point where it can successfully compete with the high pressure, high temperature process.

It is an object of the present invention to provide a process for the treatment of spent sludge or residue containing aluminum chloride from the cracking process, which will be commercially operative on a large scale, relatively inexpensive and productive of anhydrous aluminum chloride comparable for the treatment of oils with aluminum chloride produced directly from the metal.

The regeneration process of the invention may advantageously be practiced as a part of a cyclic cracking operation, the aluminum being separated from the other components of the sludge and reconverted to the form of the anhydrous chloride, preferably by means of chlorine also recoverable from the sludge, relatively small proportions of aluminum and chlorine or aluminum chloride being supplied from an outside source to make up the slight losses in the cyclic process. Our recovery process proceeds in the dry way requiring a rather high temperature which, however, is furnished substantially by the combustion of the carbonaceous components of the sludge.

In its broadest aspects our invention is independent of the particular apparatus employed for carrying it out, and, as it will appear from the specification, the latter may vary greatly from the specific form thereof described; the operation itself may also vary from the specific disclosure without departing from the invention, it being understood that the specific disclosure is for the purpose of exemplification only and that the scope of the invention is defined in the following claims in which we have endeavored to distinguish it from the prior art so far as known to us without, however, relinquishing or abandoning any portion or feature thereof.

The invention includes the complete cyclic process itself as well as certain steps of the process, which steps are themselves novel and applicable in conjunction with recovery processes other than the complete cyclic process itself. The spent sludge is first subjected to a steaming operation whereby the aluminum chloride is caused to react with the steam to form aluminum oxide and hydrochloric acid, the hydrochloric acid being driven off and recovered as a dilute solution in water, and the volatile hydrocarbons being also driven off and recovered, leaving the aluminum oxide intimately distributed through the remaining carbonaceous mass. The resulting dechlorinated sludge is then subjected to a controlled oxidizing action, for example, in a gas producer type of furnace, to remove all hydrogen-containing compounds which will yield water upon complete combustion. As a result of this treatment there remains a mixture of aluminum oxide and coke of a porous character, entirely free from hydrogen-containing bodies and containing the aluminum oxide intimately distributed throughout the porous coke.

Instead of subjecting the spent aluminum chloride sludge to successive steaming and partial oxidation operations, these operations may be combined in a single operation, for example, by using an inclined rotary furnace externally heated and fitted with air blast and steam supply. In such a furnace, by introducing the air blast counter-current to the charge, the water vapor formed by the oxidation of hydrocarbons can be taken advantage of in decomposing the aluminum chloride, this water vapor being supplemented by steam, if necessary or desirable, introduced from an external steam supply. By regulating the operation of such a furnace the aluminum chloride can be decomposed and volatile constituents driven off in the upper portion of the furnace and the completion of the removal of moisture and hydrogen-containing substances by combustion can be effected prior to the discharge of the resulting aluminum oxide coke.

The dry aluminum oxide coke, produced for example, by either of the procedures above described, and which is now free from hydrogen-containing bodies, is finally subjected to a blast furnace operation, for example, similar to that used in pig iron manufacture and the carbon of the aluminum oxide coke is utilized as the fuel for heating the charge by combustion by air, while the aluminum oxide is converted into aluminum chloride by the action of chlorine gas. This blast furnace operation is carried out with a regulated supply of absolutely dry air and dry chlorine gas, and the aluminum chloride produced is directly recovered in an anhydrous form. This blast furnace operation makes use of carbon contained in the original sludge itself for supplying the heat to carry out the operation. Fuel gases are also produced from the blast furnace operation, as well as from the preceding gas producer operation, and such fuel gas can be utilized as one of the valuable products of the process.

Figure 2A:
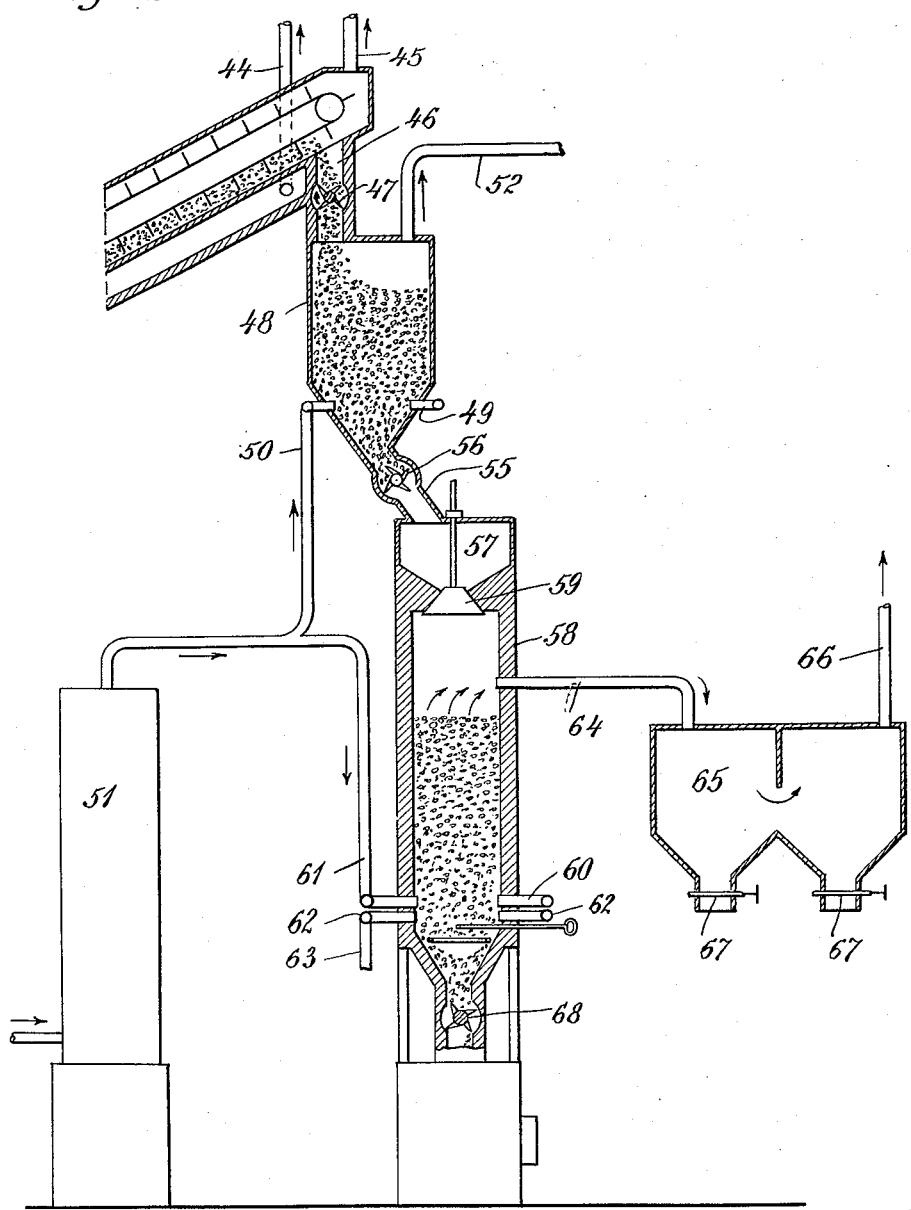

We will further describe the invention in connection with the accompanying drawings in which Fig. 1 is a diagrammatic layout of the series of operations of the complete cyclic process and Figs. 2 and 2$^a$ together show in a somewhat conventional and diagrammatic manner a layout of apparatus adapted for the practice of the process of the invention.

Before describing the operation of the process in detail it will be convenient to present an outline of the steps thereof in connection with the diagram of Fig. 1.

The anhydrous aluminum chloride to be used is preferably first mixed or emulsified with kerosene or other hydrocarbon oil to form a sludge, which is then fed into the cracking still, together with gas oil or other material to be cracked, in sufficient quantity to form a suitable charge. The still is then fired at the proper temperature and pressure, whereby the gas oil is broken down and vapors of the cracked products and small amounts of permanent noncondensible gas are driven off. The cracking operation may be either continuous or intermittent, that is, the cracking still may be operated on the batch system of operation, or continuously with continuous feed of stock and catalyzer and continuous tar draw-off. The vapors are treated in the usual or any approved manner to separate and refine the gasoline fraction thereof. The non-condensible gases may be used as fuel gases in a later described portion of the process.

In the intermittent or batch operation of the still the heating of the still is discontinued while the residue is still liquid and the latter permitted to stand for a considerable period for the spent sludge to substantially separate from the lighter components of the residue or bottoms and these lighter components may be separated by decantation or otherwise and may be returned to the still or otherwise used. In the continuous operation of the still, the spent sludge may be permitted to collect and may be continuously drawn off, while fresh amounts of aluminum chloride and of gas oil are supplied to the still. In the diagram of Fig. 1 the fresh aluminum chloride sludge and gas oil are shown as being charged into the still, and the products of the still are designated respectively as gasoline stock, non-condensible gas, cycle stock and spent sludge.

The spent sludge containing the spent aluminum chloride is charged into a steamer of suitable construction and there subjected to the action of steam while in a heated condition, whereby the aluminum chloride is decomposed, the chlorine joining with the hydrogen of the steam to form hydrochloric acid, and the aluminum combining with the oxygen of the steam to form aluminum oxide. Substantially all of the chlorine of the aluminum chloride is thus driven off as hydrochloric acid which may be collected in solution or otherwise for further use, either in the process or for some other purpose. A certain proportion of hydrocarbon gas is also driven off and may be added to the gas from the still and used for fuel or other purposes. Practically all of the hydrocarbon oils are also driven off and may be either returned to the still or otherwise used. The residue in the steamer is a porous coke-like product from which the chlorine has been substantially separated and through which the aluminum oxide is intimately distributed. The steaming operation can be carried out continuously, with charging of fresh sludge at the top of the steamer and drawing off of dechlorinated sludge from the bottom, the steam entering at the bottom and passing upwardly through the charge. The steaming operation can also be carried out intermittently or on the batch system. In the diagram of Fig. 1 the spent sludge and steam are shown in passing to the steamer and the products of the steaming operation are indicated respectively as 10° Bé. hydrochloric acid, hydrocarbon gas, hydrocarbon oil, and aluminum oxide coke.

The alumina coke from the steaming operation is next subjected to a special treatment to remove from it all hydrocarbons and hydrogen-containing and water-forming constituents. This treatment is advantageously carried out in a gas producer into which the alumina coke is charged and in which it is blown with air while hot and a controlled oxidizing action carried out, whereby substantially all of the hydrogen contained in the combined or free form is driven off as water vapor and some of the carbon burned to carbon dioxide which is thereafter reduced to carbon monoxide additional heat being produced by the partial oxidation. The gases from the producer thus contain a substantial proportion of fuel gas which may be added to the noncondensible gases produced as above described and used as fuel. By this operation the solid residue in the producer is reduced to carbon in the form of coke through which aluminum oxide is intimately distributed, and the resulting material is now thoroughly dried and freed from both free and combined hydrogen. Only a part of the carbon of the charge is utilized in the gas producer, and the action is stopped short of a point which will produce a lean carbon mixture, so that the product will retain sufficient carbon for the final blast furnace operation. In the diagram of Fig. 1 the gas producer is shown as charged with the aluminum oxide coke and supplied with air, while the rich fixed gas produced is indicated as service gas, and the product of the gas producer is indicated as dried aluminum oxide coke. It is important that this aluminum oxide coke should be entirely free from hydrogen-containing bodies.

This dry aluminum oxide coke is charged into a blast furnace in which the carbon content of the coke is utilized. In this blast furnace the charge is blasted or burned with a mixture of dry air and dry chlorine at a sufficiently high temperature to convert the aluminum oxide into anhydrous aluminum chlorine which is driven off in vapor form and condensed. The combustion of the carbon of the coke serves to maintain the desired temperature in the blast furnace. Both the air and the chlorine are completely freed from moisture before use, and the aluminum oxide coke from the gas producer is transferred to the blast furnace without permitting contact with the outside air. The blast furnace may in construction be much like those used for pig iron manufacture except that the products desired go overhead in gaseous or vapor form instead of through the hearth. By using a regulated supply of absolutely dry air and dry chlorine gas and supplying them to the bottom of the blast furnace, the anhydrous aluminum chloride and producer gas are driven off at the top and passed to a suitable condensing system, the aluminum chloride separating out in an anhydrous state and the lean producer gas going to a scrubber to remove final traces of aluminum chloride and then going to a gas storage. The chlorine utilized in the blast furnace operation may be produced or derived in any suitable manner, e. g. from the hydrochloric acid obtained from the steaming operation.

The spent ash or such aluminum oxide coke as is not converted in its first passage through the blast furnace may be returned for further treatment to the blast furnace.

In the diagram of Fig. 1, the blast furnace is shown as charged with the dried aluminum oxide coke and with air and chlorine; while the products are indicated as CO or producer gas, spent ash and aluminum chloride which is obtained directly in an anhydrous state and which is shown in the diagram as being returned for reuse in the cracking still, after admixture with kerosene or other hydrocarbon oil. In order to make up for any small loss of aluminium chloride, a small amount of aluminum chloride from another source may be added, or a sufficient amount of aluminum oxide may be added to the aluminum chloride sludge and a correspondingly increased amount of aluminum chloride produced therefrom in the blast furnace operation. For example, powdered calcined bauxite may be added to the fresh spent sludge from the cracking still and carried with it through the various subsequent steps of the process.

From this description of the process, in conjunction with the diagram of Fig. 1, it will be seen that the aluminum chloride sludge is first subjected to a steaming operation to decompose the aluminum oxide and remove hydrochloric acid and hydrocarbon oil and gas, leaving aluminum oxide distributed in a porous coke-like mass; and that this coke-like mass is first freed from moisture and hydrogen-containing substances forming moisture upon oxidation, and is then in a dry and hydrogen-free state subjected to a blast furnace operation with absolutely dry air and dry chlorine gas whereby anhydrous aluminum chloride is directly recovered in an active form suitable for reuse, and whereby the fuel supplied by the spent sludge itself is utilized to particular advantage in both the gas producer and blast furnace steps of the process and is converted into valuable fuel gas, while the combustion of this carbon supplies the necessary heat for carrying out the gas producer and blast furnace operations. The end products of the process, therefore, considering the cyclic process as a whole, are gasoline stock and commercially usable fuel gas, the intermediate stocks being available for return for further cracking, and by-products of little or no value being substantially eliminated.

The conversion of the hydrochloric acid produced by the steaming operation into gaseous chlorine for use in the blast furnace operation may be carried out in any suitable way, for example, in electrolytic cells or by the old Deacon process.

A suitable layout of apparatus for carrying out the process is illustrated somewhat diagrammatically and conventionally in Figs. 2 and 2ª. The still 1 is shown as a "cheese-box" still mounted in a suitable setting 2 and heated in any suitable way as by using the fuel gas produced by the process itself or by oil burners, etc. The still is provided with a stirrer 3 driven by bevel gears in the manner shown. The charging line for charging gas oil is indicated at 4 and that for charging the fresh aluminum chloride sludge is indicated at 5, this sludge containing e. g. 73% of aluminum chloride intimately mixed or emulsified with kerosene or other hydrocarbon oil. If preferred, pressure distillate may be used for this purpose, the aluminum chloride being mixed therewith and the mixture heated to a reacting temperature so that some or all of the objectionable unsaturated hydrocarbons are converted into saturated or unobjectionable compounds. More or less vaporization may be permited to take place or altogether prevented. The residue, or in the event that no vaporization is permitted the entire body of oil, is then permitted to remain quiescent and the heavier portion containing the aluminum chloride, the aluminum chloride sludge, settles to the bottom and may be readily separated from the supernatent oil and charged into the still at 5 as above indicated.

The vapor line from the still is indicated at 6 and leads to a suitable reflux tower 7 from the lower end of which a return pipe 8 leads reflux condensate back to the still. A vapor line 9 leads from the upper end of the reflux tower to the condenser 10, shown conventionally as a water cooled condenser having outlet and inlet pipe connections 11 and 12. The condensate and uncondensible gas escape at 13 to any suitable place of storage or further treatment, for example, the condensed vapors going to a storage tank for the cracked distillate and the uncondensible gas going to a gas storage (not shown). The condensate may then be redistilled or refractionated or otherwise treated to produce the final gasoline product.

The initial supply of anhydrous aluminum chloride for the cracking operation may be obtained by any of the known or other suitable processes or from a previous operation of the present process. The proportion of anhydrous aluminum chloride to the oil to be treated may vary within wide limits, but an amount of around 6 or 7% of the catalyzer by weight is suitable. Preferably the aluminum chloride is added after all the water has been driven out of the charging stock to be treated and after the latter has been raised to a temperature of about 300° F. and while the mechanical agitator is in motion so that the aluminum chloride sludge is thoroughly intermixed with the oil to be cracked.

During the cranking operation the still is maintained at a suitable temperature, e. g. around 550° F., and the cracking operation can be carried out at substantially atmospheric pressure. By proper manipulation of the still a stream of distillate of e. g. 15% of the total charge per hour can be obtained, and approximately 75% of the total charge of oil can be recovered as a practically saturated product similar to refinery crude naphtha which can be re-run for gasoline with low boiling point range.

As the cracking operation progresses the aluminum chloride or aluminum-chloride-hydrocarbon within the still will in time become fouled by tarry bodies resulting from the so-called cracking action until the aluminum chloride becomes spent or nearly exhausted. In the batch operation when this occurs the operation of the still can be interrupted and enough time allowed to elapse to permit the nearly exhausted catalyst and the tarry matters combined therewith to settle. At the temperature of the still the spent sludge will be a heavy viscous body, tar-like in nature, which can be pumped with proper precautions. If the still is operated continuously, a continuous stream of charging stock and a continuous stream of aluminum chloride hydrocarbon are fed to the still, either separately through the openings 4, 5, respectively or together. The fresh catalyst entering with the charging stock will maintain a continuously active cracking agent within the still.

The spent sludge is drawn off from the still through the outlet pipe 14 into a suitable collecting receptacle therefor shown as a tank 15 in which the sludge is permitted to settle and solidify. In continuous operation the sludge is driven off continuously in a small stream. This sludge contains all of the aluminum of the aluminum chloride and all of the chlorine except the small portion lost in the cracking operation. The composition of the spent sludge will be approximately one-third aluminum chloride and two-thirds residual oil, tar and coke. In batch operation, any unchanged oil that may separate as a layer above the sludge may be drawn off, the remaining portion of the unchanged oil together with the asphaltic bodies and free carbon from the cracking operation and the aluminum chloride being then charged into the steamer.

The solidified sludge from receptacle 15 is broken up in any suitable way and charged into the feed box 16 of a bucket elevator 17 which discharges into the inlet 18 of the hopper 19 of the steamer 20, entering the main chamber thereof through the opening controlled by the bell valve 21.

The steamer 20 is supplied at its bottom through pipes 22 which with steam at a suitable temperature and pressure, e. g. with steam at a temperature of 320° F., supplied at a pressure of 90 lbs. The steam enters through a series of pipes and passes under the baffles 23 into the body of broken up spent sludge.

The steam is uniformly distributed through the charge and serves to decompose the aluminum chloride and to drive off the volatile hydrocarbons which, together with the hydrochloric acid, non-condensible gas and any excess steam escape through the pipe 24 into a series of recovery columns or towers of suitable construction shown as four in number 25, 26, 27 and 28, these towers being connected with gas and vapor pipes 29, 30 and 31 leading from the top of one tower to near the bottom of the next, and with a final outlet pipe 32 for leading the permanent gases to a suitable place of storage. Cooling water enters the top of the last tower at 33 and is pumped from the bottom thereof to the top of the next tower and so on through the pipes 34, 35 and 36 each having a suitable pump therein. In these towers the condensible hydrocarbons are condensed and the hydrochloric acid is absorbed, the cooling and absorption being promoted by suitable baffles conventionally shown. The dilute hydrochloric acid solution and condensed oil escape at 37 into a suitable receptacle shown conventionally at 38 in which the oil may be permitted to separate and the oil then drawn off and returned to the cracking process. The dilute hydrochloric acid may be treated for the regeneration of chlorine therefrom.

In the operation of the steamer, the aluminum chloride sludge may be supplied either continuously or intermittently to the top of the steamer and the superheated steam supplied in regulated amount at the bottom so as to maintain a suitable temperature for decomposing the aluminum chloride and driving off hydrochloric acid and hydrocarbons. The reaction between the steam and aluminum chloride is exothermic and enough heat is supplied by the heat of reaction and by the steam or by supplemental heating if necessary to maintain a temperature of approximately 800° F. in the steamer.

As a result of the steaming operation the tarry mess of sludge is converted into a very porous coke-like product in which the aluminum oxide formed by the action of the steam on the aluminum chloride is uniformly distributed. This porous coke, which is substantially free from unchanged oil, is discharged through the bottom of the steamer through a regulated discharge valve 39 into an inclined conduit 40 having a conveyor belt 41 therein. This conduit is heated by a flue 42 by means of suitable burners 43, the products of combustion escaping at 44 and any gases and vapors driven off as a result of the heating of the coke-like mass escaping at 45 may be led to storage. This heating operation serves to drive off moisture and any remaining volatile constituents, so that the coke-like product discharged at 46 past the inlet valve 47 into the gas producer 48 will be dry and nearly freed from hydrogen containing substances.

In order to remove completely such hydrogen containing substances as remain in the coke, it is subjected in the gas producer 48 to a controlled oxidizing action by introducing dry air through the annular pipe 49 and a series of branch pipes leading into the producer. This air is completely freed from moisture, for example, in the drying tower 51. The carbon monoxide formed in the gas producer 48 and any hydrogen driven off during the treatment of the coke therein are led by pipe 52 to storage for use as fuel or the like. The blowing or blasting in the gas producer is continued until all traces of hydrocarbon and free or combined hydrogen and water vapor have been removed and the residue contains nothing but free carbon and aluminum oxide with inorganic impurities. The blasting operation is not, however, continued so far as to impoverish the coke in carbon, but sufficient carbon is left therein to permit the carrying out of the blast furnace operation with the resulting coke.

The resulting dried coke, entirely free from hydrogen-containing substances, is discharged through the outlet 55 of the gas producer into the hopper 57 of the blast furnace 58. The feed of the coke into the blast furnace is regulated by the bell valve 59. The blast furnace 58 is conventionally shown as is also the gas producer 48 and the connections there-between. The blast furnace is provided near its lower end with a series of branch pipes 60 leading from an annular pipe supplied with dry air through the supply pipe 61 from the drying tower 51. A similar series of pipes 62 is provided supplied with dry chlorine from any suitable source through the supply pipe 63. An outlet for the gas and aluminum chloride vapors formed in the blast furnace is shown at 64 leading to the condenser 65, conventionally shown, in which the anhydrous aluminum chloride is condensed and from which it is drawn off through the outlets 67, the uncondensed aluminum chloride and gas escaping at 66 to a scrubber (not shown) for removing the last traces of aluminum chloride, after which the gas is led to a place of storage or use.

In the operation of the blast furnace dry air and dry chlorine gas are supplied to the lower end of the shaft and the carbon of the coke is ignited and burned by the air with resulting heating of the charge and production of producer gas, while the dry chlorine acts upon the aluminum oxide, in the presence of the carbon, and forms anhydrous aluminum chloride which is driven off and recovered in an anhydrous state. The temperature can be readily controlled by the rate at which the air is introduced, this heat being supplied internally by the combustion of the carbon of the coke itself. By regulating the supply of air and chlorine a continuous production of anhydrous aluminum chloride will take place, and a low heating value fuel gas, will also result. The blast furnace can be operated so that only a small percentage of the charge passes the grate 70 (conventionally shown). Such portions of the charge as pass the grate may be admixed with fresh sludge and again carried through the process.

In the operation of the blast furnace we have found it essential to treat the aluminum oxide coke to insure complete removal therefrom of hydrogen-containing constituents such as can react with air to form moisture; and we have also found it essential to remove moisture as well from both the air and the chlorine gas supplied to the blast furnace. The coke itself is freed from moisture and moisture-forming constituents in the preliminary treatment before it reaches the blast furnace. The air and chlorine should be similarly freed from moisture. When this is done, that is, when the air and chlorine are entirely free from moisture, and when the preliminary blasting of the charge is continued until the last traces of hydrocarbon, hydrogen and water vapor have been removed, the blast furnace operation can then be carried on with the direct production of anhydrous aluminum chloride suitable for use directly in the further carrying out of the oil cracking operation. But unless the charge is preliminarily treated, and the air and chlorine completely dried, moisture will be present or formed in the blast furnace and the aluminum chloride recovered in the subliming chamber will be admixed with moisture so that anhydrous aluminum chloride will not be produced.

The dry air for the blast furnace operatation may advantageously be produced by first subjecting it to refrigeration, for example, using the Gayley dry blast system to remove the major portion of the moisture, and by then passing the air through a drying tower containing anhydrous calcium chloride or in which concentrated sulphuric acid is circulated. In this way the air can be completely freed from moisture before it is supplied to the blast furnace.

The chlorine can be similarly freed from moisture before use. It may be supplied from a source of liquid chlorine, or it may be regenerated from the dilute hydrochloric acid produced by the steaming step of the process. The dilute hydrochloric acid may be absorbed by using a dilute caustic solution in the absorption tower and the resulting sodium chloride brine may be electrolyzed to form chlorine and caustic, and the resulting chlorine may then be used, after drying, in the blast furnace, or the hydrochloric acid can be treated by the Deacon process and a mixture of chlorine and air directly produced containing, for example, not over 20% chlorine which, after drying, can be supplied to the blast furnace, the chlorine and air being thus supplied in admixture.

The anhydrous aluminum chloride produced in the blast furnace operation above described has been found to be fully as effective for use in oil cracking as pure aluminum chloride made from metallic aluminum. The recoveries of aluminum chloride are moreover high, while any deficiency and loss can be made up by incorporating an additional amount of aluminum oxide with the sludge before its treatment, with corresponding formation of an increased amount of aluminum chloride in the blast furnace operation.

It will thus be seen that the process of the present invention provides a process adapted to operate as a closed cycle in which advantage is taken of the various ingredients of the aluminum chloride sludge and in which these ingredients are substantially all recovered or utilized in the regeneration process, the aluminum chloride itself being regenerated and recovered in an anhydrous state of high activity adapted for reuse in the cracking process; while the hydrocarbon and carbon constituents of the spent sludge are either recovered for reuse (in the case of the hydrocarbons driven off in the steaming operation) or are utilized by partial combustion to supply heat in the subsequent steps of the process and are converted into fuel gas which is itself available for use in supplying heat, for example to the cracking still, or for other purposes. In particular, the external heating of the coke during the aluminum chloride formation is eliminated, and the charge is internally heated without the addition or consumption of extraneous fuel by utilizing as fuel the carbon of the charge itself and with recovery of an important portion of the fuel value of this carbon in the form of fuel gas. This salvage or recovery of the excess fuel value of the charge, and the utilization of part of the fuel value in the carrying out of the regeneration process itself, results in an important economy in the commercial carrying out of the regenerative process. The relation of the various steps of the process is moreover such that the regeneration can be carried out more or less continuously and in a closed cycle. Starting with gas oil, for example, and with an initial amount of aluminum chloride adequate for the initiation of the process, the process can thereafter be carried out with the production as end products of motor fuel stock and of commercially usable fuel gas, all other products being adapted for return to the cracking operation as in the case of the heavier oil fractions or being utilized as fuel in the process or for the production of fuel gas. In this closed cycle of operations the only additional reagents are those necessary to make up for losses, but these losses are readily supplied by the addition of aluminum oxide and chlorine without otherwise modifying the regeneration process. The chlorine employed may or may not be regenerated from the hydrochloric acid formed; when so regenerated, however, only sufficient additional chlorine to make up for losses is required.

It will accordingly be seen that the process of the present invention is well adapted for commercial use in refinery operations, supplying a balanced and closed cycle of operations for converting the intermediate fractions of crude petroleum into motor fuel or gasoline and into fuel gas, with complete utilization of by-products in the cyclic process.

In addition to the complete cyclic process, however, certain steps of the process are themselves novel and advantageous and these are separately claimed as forming part of the invention, aside from the complete cyclic or regenerative process as a whole.

In the foregoing specification wherever we have referred to the air, the chlorine or the coke as completely or entirely dry, it is to be understood that we mean that steps have been taken such as those described, to free the materials from moisture and it is obviously desirable that these operations be as effective as possible, as it is known that the presence of moisture seriously interfere with the operation of the aluminum chloride as a catalyst in the treatment of oil. Traces of moisture, however, while undesirable and pro tanto, reducing the efficiency of the process, do not remove it from the scope of the invention.

We claim:

1. The improvement in recovering hydrochloric acid from residues of oil containing aluminum chloride consisting in the single step of contacting said residues directly with super heated steam.

2. The method of treating spent aluminum chloride sluge which comprises subjecting the same to the action of steam at an elevated temperature and thereby removing volatile hydrocarbons and converting the sludge into a porous coke-like mass containing aluminum oxide intimately combined therewith.

3. The method of treating spent aluminum chloride sludge which comprises permitting the same to solidify, breaking up the solidified sludge and subjecting the broken up sludge to the action of steam at an elevated temperature.

4. The method of treating spent aluminum chloride sludge which comprises subjecting the same to the action of steam at an elevated temperature to decompose the aluminum chloride and form a porous coke-like mass containing aluminum oxide, and subsequently subjecting the coke-like mass to the action of chlorine at an elevated temperature to regenerate aluminum chloride therefrom.

5. The method of treating spent aluminum chloride sludge which comprises subjecting the same to the action of steam at an elevated temperature to decompose the aluminum chloride and to partial combustion to free the same from hydrogen-containing substances, and subsequently subjecting the same to the action of chlorine at an elevated temperature for the regeneration of aluminum chloride therefrom.

6. The method of treating spent aluminum chloride sludge which comprises subjecting the same to the action of steam at an elevated temperature to decompose the aluminum chloride and form a porous coke-like mass containing aluminum oxide, subjecting the resulting coke-like product to a regulated partial combustion with air to remove moisture and all hydrogen-containing substances therefrom, charging the resulting material into a blast furnace and heating the charge internally by the introduction of dry air and passing chlorine into contact therewith, whereby aluminum chloride is regenerated directly in an anhydrous state.

7. The method of treating spent aluminum chloride sludge which comprises subjecting the same to the action of steam at an elevated temperature to decompose the aluminum chloride and form a porous coke-like mass containing aluminum oxide, removing all moisture and hydrogen-containing substances from the resulting material then charging the same into a blast furnace and heating the same internally by the introduction of dry air, dry chlorine also being introduced into the blast furnace, with resulting formation of anhydrous aluminum chloride.

8. The method of treating spent aluminum chloride sludge which comprises subjecting the same to treatment with steam at an elevated temperature to decompose the aluminum chloride and form a porous coke-like residue containing aluminum oxide, removing moisture and hydrogen-containing substances from such product, and subjecting the resulting product to a blast furnace operation with the introduction of dry air and dry chlorine whereby the charge is heated internally by combustion of the carbon of the charge and anhydrous aluminum chloride directly produced.

9. The method of producing anhydrous aluminum chloride which comprises subjecting aluminum oxide coke, resulting from the treatment of spent aluminum chloride sludge with steam, to partial combustion with dry air to remove all moisture and hydrogen-containing substances, and subsequently subjecting the resulting coke to a blast furnace operation with introduction of dry air and chlorine, whereby the heating of the charge, both for the removal of hydrogen-containing substances and in the blast furnace, is affected by combustion of the carbon of the coke itself, and whereby anhydrous aluminum chloride is directly produced by the blast furnace operation.

10. The cyclic method for the cracking of oil with aluminum chloride and for regenerating the aluminum chloride, which comprises subjecting the oil to the action of aluminum chloride at an elevated temperature until the aluminum chloride becomes spent, withdrawing the spent sludge and subjecting the same to the action of steam at an elevated temperature, whereby the aluminum chloride is decomposed to form aluminum oxide and hydrochloric acid and the sludge is converted into a coke-like mass containing the aluminum oxide, heating the resulting coke-like mass by partial combustion to remove moisture and hydrogen-containing substances therefrom, subjecting the resulting coke-like product to a blast furnace operation with introduction of dry air and dry chlorine, whereby anhydrous aluminum chloride is regenerated, and returning the anhydrous aluminum chloride to the oil cracking still for the further carrying out of the cracking operation.

11. The method of treating spent aluminum chloride sludge for the recovery and utilization of the valuable constituents thereof, which comprises subjecting the spent sludge to the action of steam at an elevated temperature and thereby driving off volatile hydrocarbons and hydrochloric acid produced by the action of the steam on the aluminum chloride, and leaving a coke-like product containing aluminum oxide, recovering the volatile hydrocarbons and hydrochloric acid thus driven off, subjecting the coke-like product to partial combustion with air to remove hydrogen-containing substances and to give a fuel gas produced by the partial combustion and subjecting the remaining coke-like product to a blast furnace operation with the introduction of dry air and dry chlorine, whereby anhydrous aluminum chloride is directly produced by the blast furnace operation together with additional fuel gas resulting from the partial combustion of the carbon of the coke.

12. The continuous method of treating spent aluminum chloride sludge which comprises charging the same into the top of a tower, subjecting the same therein to the action of steam introduced near the bottom of the column and thereby decomposing the aluminum chloride and forming hydrochloric acid and a coke-like product containing aluminum oxide, withdrawing the hydrochloric acid and other volatile products from near the top of the column and withdrawing the coke-like product containing aluminum oxide from the bottom of the column.

13. The continuous method for the treatment of spent aluminum chloride sludge which comprises subjecting the sludge in a progressive and continuous manner to the action of steam at an elevated temperature, whereby the aluminum chloride is decomposed and hydrochloric acid driven off and a coke-like residue containing aluminum chloride formed, drawing off the coke-like residue and subjecting the same in a progressive and continuous manner to a gas producer portion with partial combustion of the carbon of the coke and removal of all hydrogen-containing substances, and subjecting the resulting coke in a progressive and continuous manner to a blast furnace operation with the introduction of dry air and dry chlorine, whereby anhydrous aluminum chloride and additional fuel gas are produced from the blast furnace operation in a substantially continuous manner.

14. The method of treating spent aluminum chloride sludge which comprises subjecting the same to the action of steam at an elevated temperature to decompose the aluminum chloride and to partial combustion to free the same from hydrogen-containing substances, the steam resulting from the combustion of hydrogen-containing substances being employed to decompose the aluminum chloride.

15. The method of treating spent aluminum chloride sludge which comprises subjecting the same in a progressive and continuous manner to the action of steam to decompose the aluminum chloride and to partial combustion with air to remove hydrogen-containing substances, the steam resulting from the combustion of the hydrogen-containing substances being utilized in the decomposition of the aluminum chloride, and subjecting the resulting coke-like product containing aluminum oxide to the action of chlorine at an elevated temperature for the production of aluminum chloride therefrom.

16. The method of producing anhydrous aluminum chloride which comprises subjecting aluminum oxide coke resulting from the treatment of spent aluminum chloride sludge with steam to an external heating operation to remove substantially all moisture and hydrogen containing substances, followed by partial combustion with air to remove final traces of moisture and hydrogen containing substances, and subsequently subjecting the resulting coke to a blast furnace operation with the introduction of dry air and dry chlorine whereby the charge is heated internally by combustion of the carbon in the charge and anhydrous aluminum chloride directly produced.

ERNEST B. PHILLIPS.
JAMES G. STAFFORD.